July 19, 1960  JICHIO TOMODA  2,945,464
JACKETED SOLDERING STRIP
Filed Jan. 22, 1954

INVENTOR.
JICHIO TOMODA
BY HIS ATTORNEYS.
HARRIS, KIECH, FOSTER & HARRIS

United States Patent Office 2,945,464
Patented July 19, 1960

---

2,945,464

JACKETED SOLDERING STRIP

Jichio Tomoda, Lynwood, Calif.
(1109 State St., San Mateo, Calif.)

Filed Jan. 22, 1954, Ser. No. 405,636

4 Claims. (Cl. 113—110)

The present invention relates to the soldering art and a primary object of the invention is to provide a solder-containing element, preferably in strip form, which may be applied to any object, such as a wire joint, to be soldered, which will remain in place on the object to which it is applied of its own accord without the use of any auxiliary retaining means, which prevents the escape of molten solder without any special preparation of the object to be soldered so as to minimize waste, which permits the solder to be heated to a free-flowing state to produce a substantially perfect soldered joint, which minimizes oxidation of the molten solder, which is an excellent electrical conductor to minimize the electrical resistance of an electrical connection soldered thereby, which may be heated by any suitable means to melt the solder therein, and which is inexpensive.

More particularly, an object of the invention is to provide a soldering element, preferably in strip form, which includes a core of solder in a thin, readily bendable, substantially nonresilient, metallic jacket of uniform thickness open on one side to expose one side of the core, the soldering element being applicable to an object to be soldered with the exposed side of the core next to the object, and the solder melting at a lower temperature than the metal of the jacket so that the jacket retains the molten solder in contact with the object when the soldering element is heated to a temperature between the melting temperatures of the solder and the jacket. The solder may thus be heated to a free-flowing state to insure a substantially perfect soldered joint and, at the same time, the jacket minimizes oxidation of the solder. As previously indicated, the soldering element is preferably in the form of a solder-containing strip, in which case the jacket is preferably an elongated, generally channel-like element.

The jacket of the soldering strip is preferably metallic, although it may, in some instances, be formed of other materials so long as the material of the jacket is capable of withstanding the melting temperature of the solder. Various metals, such as copper or aluminum, may be utilized for the jacket, the former being particularly desirable for soldering electrical connections because of its low electrical resistance. In order to render the soldering strip easily bendable around an object to be soldered, such as an electrical connection, the jacket is made of a ductile material which is easily bent manually around any object regardless of its size or shape. When a metallic jacket, such as one of copper or aluminum, is utilized, as is preferable, the jacket may be of the order of thickness of ordinary metal foil, although the thickness of the jacket may range anywhere from approximately 0.005 inch to approximately 0.020 inch. For special applications, the jacket thickness may exceed the maximum mentioned, e.g., where extra strength is desired. Thinner jackets may also be used for special applications, e.g., for joints which have to be disconnected from time to time so that part of the jacket may be scraped off to permit melting out the solder.

Another object is to provide such a soldering element or strip which includes a suitable flux, the flux preferably being embedded in the solder core.

Another object is to provide a combustion-type heating device for soldered joints which is readily removable from the joint after completion of the soldering operation. More particularly, an object is to provide a device which includes a split, one-part or two-part tube coated with a heat producing, combustible material, the split tube being readily removed after completion of the soldering operation.

The foregoing objects, advantages and features of the present invention, together with various other objects, advantages and features thereof which will become apparent, may be attained with the exemplary embodiments of the invention which are illustrated in the accompanying drawing and which are described in detail hereinafter. Referring to the drawing.

Figure 1:
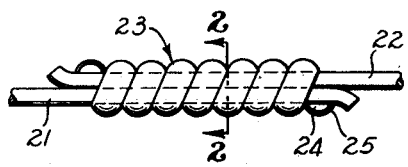
Fig. 1 is a perspective view of a wire connection having a soldering element or strip of the invention applied thereto.
Figure 2:
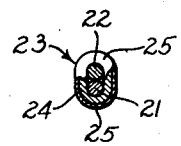
Fig. 2 is a transverse sectional view taken along the arrowed line 2—2 of Fig. 1.

Referring first to Figs. 1 and 2 of the drawing, illustrated therein is a wire connection composed of wires 21 and 22 laid side by side and having a soldering strip 23 of the invention spirally wrapped therearound, preferably with the convolutions of the spiral in contact. The soldering strip 23 includes an elongated core 24 of solder in a thin, readily bendable, substantially nonresilient, elongated, generally channel-like, metallic jacket 25 of uniform thickness open on one side to expose one side of the core 24, the strip being wrapped around the wires 21 and 22 with the exposed side of the core next to the wires. The strip 23 is readily deformable permanently so that it may be wrapped around the wires 21 and 22 easily and so that it will remain in place without any auxiliary retaining means once it is wrapped around the two wires, the edges of the channel-shaped jacket 25 gripping the wires 21 and 22 to hold the soldering strip 23 firmly in place. Thus, the soldering strip 23 is entirely self-sufficient, which is an important feature since it may be bent around the desired object manually and will stay in place after it is so bent. If desired, the soldering strip 23 may be supplied on a spool, not shown, from which lengths may be cut as required. Alternatively, the soldering strip may be supplied in stick form, as shown at 26 in Figs. 10 and 11. The strip 26 includes a solder core 27 and a jacket 28 having closed ends 29 to keep the molten solder from running out the ends.

After the soldering strip 23, or the strip 26, has been wrapped around the wires 21 and 22 in the manner described and as shown in Figs. 1 and 2 of the drawing, the wires first having been prepared for soldering in the usual manner, it is heated in any suitable manner to a temperature above the melting temperature of the solder but to a temperature lower than the maximum temperature which the material of the jacket 25 is capable of withstanding, which is the melting temperature of the material of the jacket in the event that a metallic jacket is used, which is preferable. As will be apparent, the jacket 25 confines the molten solder so that there is no waste, or at least a minimum of waste, this being accomplished without any special preparation of the object being soldered. If the strip 26 is used, the closed ends 29 of the jacket 28 keep the solder from running out the ends of the jacket. The same effect may be attained with the strip 23 by crimping the ends of the jacket 25 closed with a pair of pliers, for example. However, in many instances the surface tension of the molten solder will prevent loss from the jacket ends even if left open since the openings are relatively small.

The invention provides a substantially perfect solder deposit because, since the jacket prevents leakage, the solder may be heated to a free-flowing state to insure a top quality joint, the jacket at the same time minimizing oxidation of the solder. Additionally, by using for the jacket a metal having high electrical conductivity, such as copper, the connection between the wires 21 and 22, assuming that it is an electrical connection, has a very low electrical resistance because of the fact that the jacket contacts the wires 21 and 22 substantially throughout its entire length to provide a path for current flow through the connection, which is an important feature.

The invention also results in soldered joints which are very economical from several standpoints. First of all, since the jacket prevents the escape of the molten solder and minimizes oxidation, the amount of solder used is restricted to a minimum. Also, a great deal of time is saved in making a soldered joint with the present invention since, as will be apparent, the connection may be wrapped with the soldering strip 23, or the strip 26, manually with a minimum effort and no particular care or skill is required in the actual soldering operation since it is merely necessary to heat the wrapped connection in any suitable manner so that a great deal of time is saved. Also, the soldering strip may be manufactured quite inexpensively.

Figure 3:
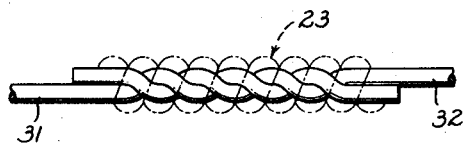
Fig. 3 is a perspective view showing the soldering strip of the invention in phantom as applied to a different type of wire connection from the one shown in Figs. 1 and 2 of the drawing.

Referring to Fig. 3 of the drawing, illustrated therein is a wire connection composed of wires 31 and 32 and having a soldering strip of the invention, shown in phantom, wrapped therearound, the wire connection of Fig. 3 differing from that of Fig. 1 in that the ends of the wires 31 and 32 are twisted together. However, it will be understood that the present invention is not limited to the particular types of connections illustrated in Figs. 1 and 3 of the drawing since it is susceptible of a wide variety of applications.

Figure 4:
Figs. 4 to 9 are transverse sectional views respectively illustrating different soldering strip embodiments of the invention.
Figures 5, 6, 7, 8, 9:
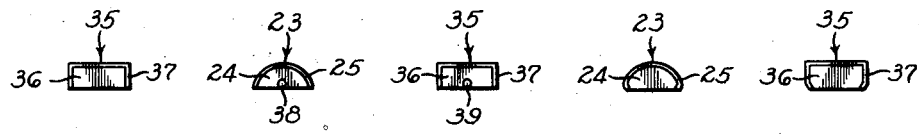
Figures 10, 11:
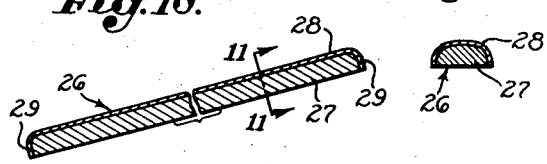
Figs. 10 and 11 are sectional views illustrating still another soldering strip embodiment of the invention, Fig. 11 being taken along the broken line 11—11 of Fig. 10.

Figs. 4 and 11 of the drawing show the soldeirng strips 23 and 26 as being semielliptical or semicircular in cross section while Fig. 5 of the drawing shows a soldering strip 35 of rectangular cross section, the soldering strip 35 including a solder core 36 and a jacket 37 respectively corresponding to the core 24 and the jacket 25 of the strip 23. Figs. 6 and 7 respectively correspond to Figs. 4 and 5, except that suitable fluxes 38 and 39 are embeded in the solder cores 24 and 36, respectively.

Figs. 8 and 9 respectively correspond to Figs. 4 and 5, differing only in that the edges of the jackets 25 and 37, respectively, are turned inwardly upon the cores 24 and 36, respectively, to insure retention of the cores within the jackets. Such inturned jacket edges are desirable in the event that the jackets are made of a material such as aluminum, to which the solder will not bond to insure its retention. Consequently, aluminum may be utilized where it is desired to peel off the jacket after soldering. With a jacket material such as copper, inturned jacket edges are not required since a satisfactory bond between the copper and the solder is obtained.

Figure 12:
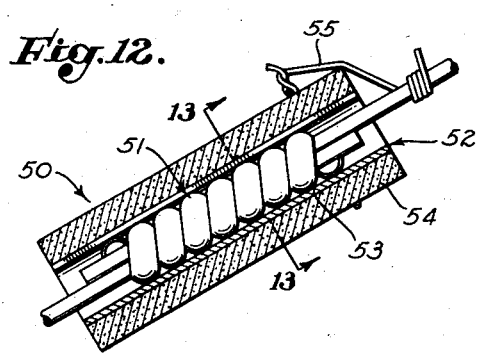
Fig. 12 is a longitudinal sectional view illustrating a combustion type heating device of the invention.
Figure 13:
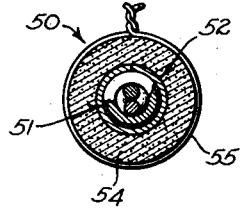
Fig. 13 is a transverse sectional view taken along the arrow line 11—11 of Fig. 10.

Referring now to Figs. 12 and 13 of the drawing, illustrated therein is a combustion-type heating device 50 of the invention which may be utilized to heat solder-wrapped joints to melt the solder thereof in soldering the joint. As shown in Figs. 12 and 13, the heating device 50 is shown slipped over a solder-enclosed joint 51, which may be similar to the joints shown in Figs. 1 and 3. The device 50 includes a split tube 52, having either one or more parts, a one-part split tube being shown. The split tube 52 is provided with a coating 54 of a combustible, heat generating compound of any suitable type.

In use, the device 50 is slipped over one of the wires which make up the joint 51, the two wires thereof being joined and wrapped with solder, as by wrapping with one of the soldering strips hereinbefore discussed. Thereafter, the heating device is slipped over the joint so that the joint is disposed within the split tube 52. If necessary, a wire 55, or the like, may be wrapped around the heating device 50 and tied to one of the wires making up the joint 51 to keep the heating device 50 from slipping. Thereafter, the combustible coating 54 is ignited in any suitable manner and the heat generated thereby solders the joint 51, as is well known in the art. Since the tube 52 is a split tube, it may be removed from the joint 51 readily after the soldering action is completed, which is an important feature.

Although I have disclosed exemplary embodiments of my invention herein for purposes of illustration, it will be understood that various changes, modifications and substitutions may be incorporated in such embodiments without departing from the spirit of the invention as defined by the claims appended hereto.

I claim as my invention:

1. A manually bendable soldering strip including an elongated core of solder in and filling a ductile manually bendable, substantially nonresilient, elongated, generally channel-shaped jacket of metal foil open on one side to expose one side of said core, said strip being adapted to be placed against an object to be soldered with said open side of said jacket facing the object so that said exposed side of said core is in contact with the object, said exposed side of said core being flush with said open side of said jacket so that the edges of said jacket also contact the object, and said jacket being formed of a metal capable of withstanding the melting temperature of the solder, whereby said jacket retains said solder in contact with the object when said strip is heated to the melting temperature of said solder.

2. A manually bendable soldering strip including an elongated core of solder in and filling a thin, ductile, manually bendable, substantially nonresilient, elongated, channel-shaped jacket of metal foil open on one side to expose one side of said core, said exposed side of said core being flush with said open side of said jacket, said solder melting at a lower temperature than the metal of said jacket.

3. A manually bendable soldering strip including an elongated core of solder in and filling a thin, ductile, manually bendable, substantially nonresilient, elongated, channel-shaped, metallic jacket of uniform thickness open on one side to expose one side of said core, the thickness of said jacket being not more than about 0.020 inch, said exposed side of said core being flush with said open side of said jacket, and said solder melting at a lower temperature than the metal of said jacket.

4. A manually bendable soldering element including a core of solder in and filling a thin, ductile, manually bendable, substantially nonresilient, generally U-shaped metallic jacket of uniform thickness open on one side to expose one side of said core, the thickness of said jacket being between about 0.005 inch and about 0.020 inch, said exposed side of said core being flush with said open side of said jacket, and said solder melting at a lower temperature than the metal of said jacket.

References Cited in the file of this patent

UNITED STATES PATENTS

| | | |
|---|---|---|
| 934,711 | Chapman | Sept. 21, 1909 |
| 1,067,415 | Egner | July 15, 1913 |
| 1,151,679 | Graves | Aug. 31, 1915 |
| 1,387,157 | Jones | Aug. 9, 1921 |
| 1,823,974 | Ferguson | Sept. 22, 1931 |
| 2,055,276 | Brownsdon et al. | Sept. 22, 1936 |
| 2,503,564 | Reeve | Apr. 11, 1950 |
| 2,569,956 | Schiltknecht | Oct. 2, 1951 |
| 2,664,844 | Siegrist et al. | Jan. 5, 1954 |
| 2,667,865 | Herman | Feb. 2, 1954 |
| 2,684,043 | Hughes | July 20, 1954 |

UNITED STATES PATENT OFFICE

CERTIFICATE OF CORRECTION

July 19, 1960

Patent No. 2,945,464

Jichio Tomoda

It is hereby certified that error appears in the printed specification of the above numbered patent requiring correction and that the said Letters Patent should read as corrected below.

Column 3, line 59, for "soldeirng" read -- soldering --; column 6, line 10, list of reference cited, add the following:

1,382,607   Rathbone et al. ---- June 21, 1921
1,916,989   Rader ------------- July 4, 1933

Signed and sealed this 20th day of December 1960.

(SEAL)
Attest:
KARL H. AXLINE
Attesting Officer

ROBERT C. WATSON
Commissioner of Patents